Aug. 25, 1953   D. J. TYERMAN   2,649,788
WHEEL TOE-IN CHANGE INDICATOR
Filed Nov. 13, 1950   2 Sheets-Sheet 1
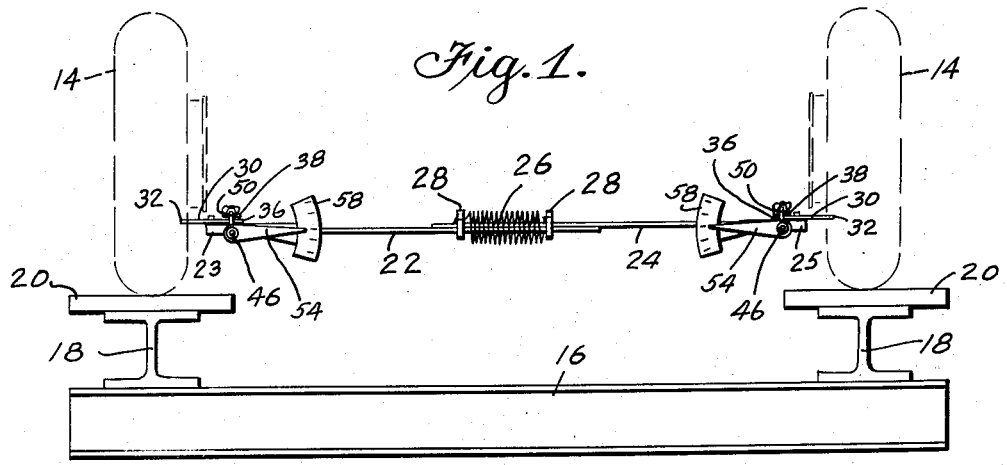
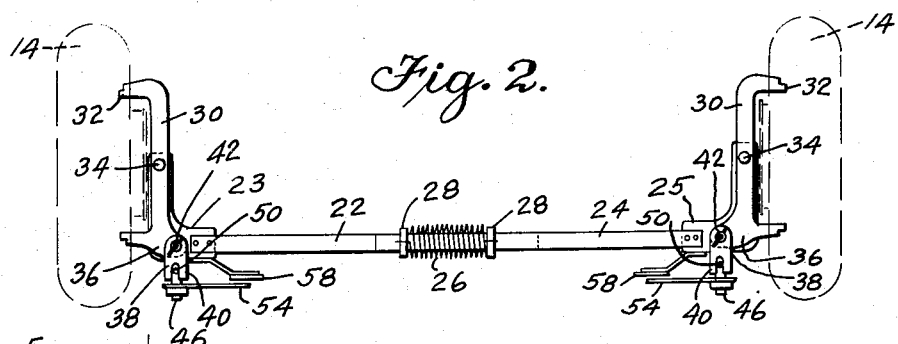
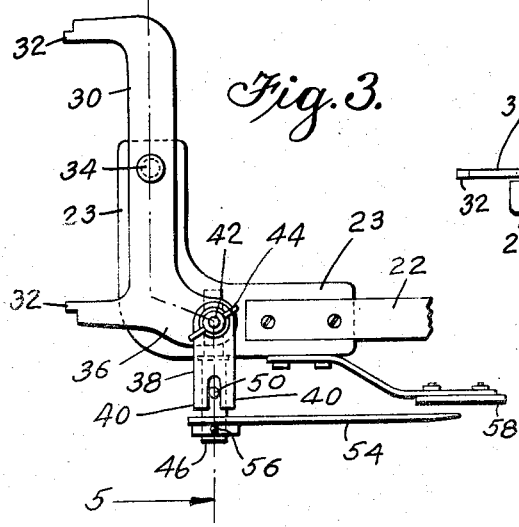
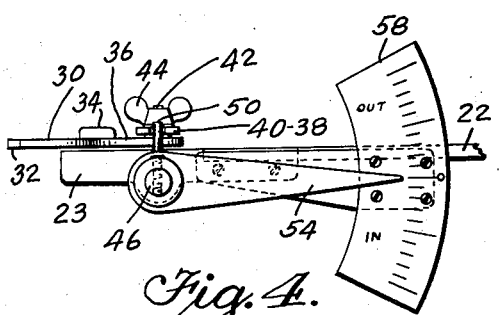
INVENTOR.
David J. Tyerman.
BY
Albert J. Fike
ATTORNEY.

Aug. 25, 1953 D. J. TYERMAN 2,649,788
WHEEL TOE-IN CHANGE INDICATOR
Filed Nov. 13, 1950 2 Sheets-Sheet 2
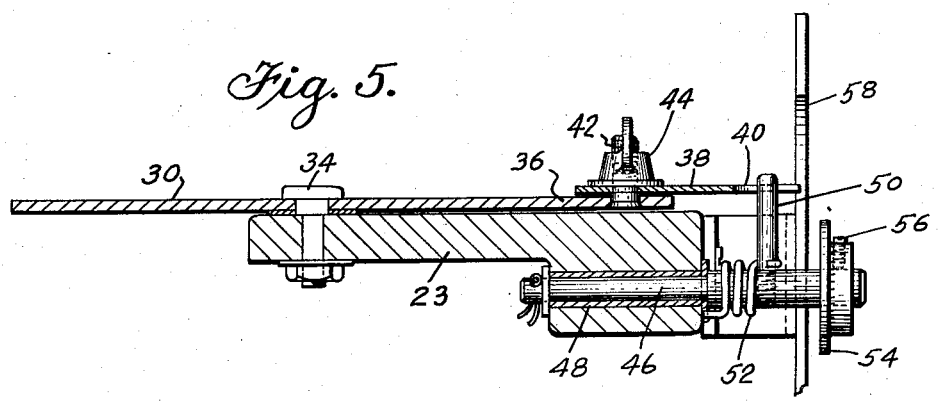
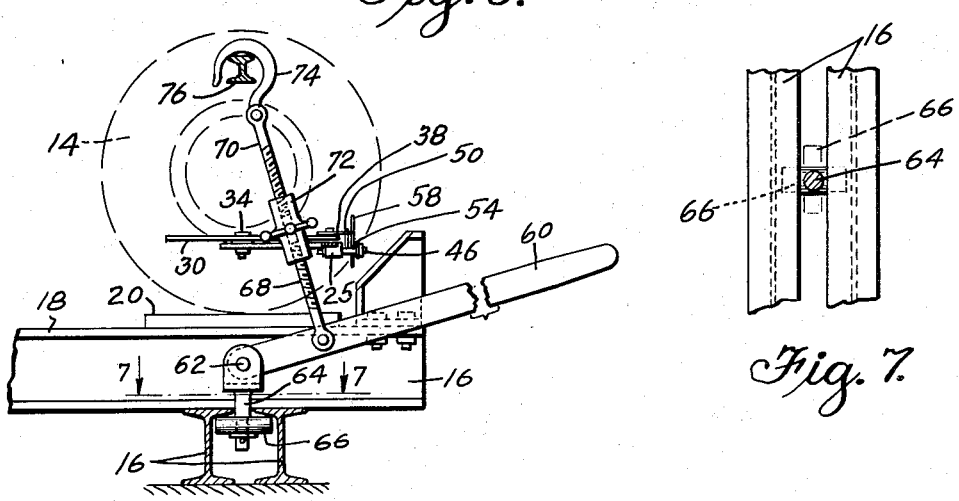
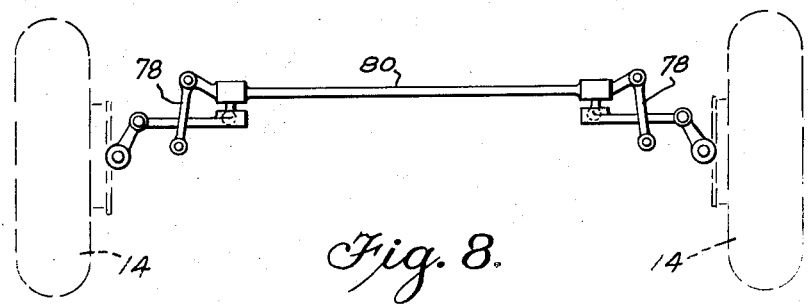
INVENTOR.
David J. Tyerman.
BY
Albert J. Fihe
ATTORNEY.

Patented Aug. 25, 1953

2,649,788

UNITED STATES PATENT OFFICE 2,649,788

WHEEL TOE-IN CHANGE INDICATOR

David J. Tyerman, Burbank, Calif.

Application November 13, 1950, Serial No. 195,321

1 Claim. (Cl. 33—203.2)

This invention relates to a wheel toe-in change indicator and has for one of its principal objects the provision of a simple, yet effective, device which can be readily applied to the front wheels of an automotive vehicle and which will immediately indicate any change of toe-in of the wheels resulting from a change of the load on the wheels. Research and experimentation have proven that the toe-in of the front wheels of an automotive vehicle, unless properly adjusted with relation to the steering gear and spring suspension, will vary sometimes to a considerable extent when the load on the front wheels on the vehicle generally changes. Obviously, such a variation may seriously affect the life of the vehicle tires.

One of the important objects of this invention is to provide a gauge or indicator which, when applied to the front wheels of an automotive vehicle, will immediately indicate to the operator or observer any change in toe-in of the wheels which results from a change in load on the front wheels or on the vehicle generally. Obviously, if there is no change in toe-in, regardless of load, the alignment is proper, and if there is a change, a corresponding adjustment must be made.

Another object of the invention is to provide a change indicator for vehicle wheels which can be readily applied and which can be used in conjunction with a load changing device so that the operator will immediately ascertain whether or not a faulty adjustment exists.

A still further important object of the invention resides in the provision of a toe-in change indicator for vehicle wheels which can be used in conjunction with other indicators now on the market with a slight adaptation. This toe-in adjustment is distinguished from a camber adjustment for the wheels.

Other and further important objects of the invention will be apparent from the disclosures in the accompanying drawings and following specification.

The invention, in a preferred form, is illustrated in the drawings and hereinafter more fully described.

In the drawings:

Figure 1 is a front elevation of the improved wheel toe-in change indicator of this invention showing the same as applied to the front wheels of an automobile or truck.

Figure 2 is a top plan view of the structure of Figure 1.

Figure 3 is an enlarged detail of one end of the structure as illustrated in Figure 2.

Figure 4 is an enlarged detail of the left hand gauge and its connections as disclosed in Figure 1.

Figure 5 is an an enlarged view, partly in section, showing the scale or gauge, its indicator needle and associated connections.

Figure 6 is a side elevation of the load changing mechanism which is used in conjunction with the toe-in change indicator of this invention.

Figure 7 is a sectional view taken on the line 7—7 of Figure 6 looking in the direction indicated by the arrows.

Figure 8 is a top plan view of a representative set of tie-rod and steering connections of an automotive vehicle showing particularly those portions which can be adjusted to remedy undesirable changes in toe-in of the wheels when subjected to varying loads.

As shown in the drawings:

The reference numerals 14 indicate generally the front wheels of an automotive vehicle and illustrating the same positioned upon a wheel alignment apparatus which is common in the art and which includes a supporting beam 16, cross bars 18 and wheel supporting plates 20.

The device itself comprises a pair of bars 22 and 24 arranged for sliding or telescoping relationship and which bars are normally impelled into an extended relationship by means of a central spring 26 operating against supports 28 on the bars. Fixed on the end of each bar 22 and 24 is an extension 23 and 25, respectively, somewhat L-shaped as shown and pivotally mounted on the end of each of these extensions 23 and 25 is a bifurcated element 30 having projections 32 adapted to contact the rims, tires or other portions of the wheels 14.

When the device is positioned between the wheels, it is held in such position by means of the spring 26. The pivot between the cross bars and the bifurcated element 30 is at 34, as best shown in Figures 2 and 3. Each of the bifurcated elements 30 is provided with an integral extension 36 which has adjustably mounted thereon, as best shown in Figure 5, a further extension 38 which is forked at its ends as shown at 40 in Figure 3.

The adjustment by the forked element 38 and its support 36 is provided by means of a bolt 42 fixed in the end of the extension 36 and a winged nut 44 on the bolt whereby the positioning of the element 38—40 can be varied with respect to its supporting element 30—36.

Immediately below the forked element 38—40 and in substantial alignment therewith is a shaft 46 rotatably mounted in a suitable bearing 48, which bearing is in the extension 23 of the bar 22. This shaft 46 extends outwardly from its support and beyond the end of the fork 38—40. A pin 50 is fixed in the shaft 46 and extends upwardly therefrom with its end in position between the forks 40 and a helical spring 52 surrounds the shaft 46 in such a manner that the pin 50 is almost forced into actual engagement with one tine of the fork 40.

A needle or indicator 54 is fixed on the outer end of the shaft 46 by means of a set screw and the like 56 and the outer end of this needle or indicator is adapted to move over a gauge or scale 58 mounted on both of the elements 23 and 25 in proper juxtaposition with a pointer 54. This scale is preferably graduated in feet per miles variance, but any other designation or graduation can be employed. A zero point is indicated at the middle portion of the scale and variation in one direction or another will be obvious as the pointer 54 moves thereover.

The winged nut 44 is employed to fit the indicator at a zero reading for better and more accurate observations. Adapted to be used in conjunction with the toe-in change indicator of this invention is a load changing device. This is best shown in Figure 6 and comprises essentially a lever or handle 60 pivotally mounted at its inner end 62 to a support 64 having a toggle element or the like 66 rotatably mounted thereon which can be conveniently fastened into position between the I-beams 16 of the testing apparatus.

Pivotally mounted on the lever or handle 60 adjacent its inner end is a turn buckle element 68—70 having an adjusting screw device 72 thereon whereby it can be shortened or lengthened as the occasion arises. A hook 74 is fixed on the outer end of this turnbuckle and this is adapted to be fixed into position over the beam or some other portion of the frame 76 of the vehicle.

After the gauge 22, 24, etc. is positioned between the wheels 14 and the load changing element just described is fitted into position between the support 16 and the frame 76 of the car, the effective load on the wheel or wheels can be readily changed by a corresponding movement of the handle 60. At the same time, the operator observes the gauges 54—58 and if any variation occurs from the preset zero reading while the load on the vehicle is being changed, it will be obvious that the toe-in of the wheels is changing with the varying load, in which event a movement of the car with that particular wheel positioning and load will result in the corresponding wear of the vehicle tires.

It has been found that this can be corrected by bending the links 78 which are connected to the tie-rod 80 which forms part of the steering structure. The links can be bent either upwardly or downwardly, preferably while the indicating device of this invention is in position and while changes in load are being made so that eventually a height adjustment is accomplished which will eliminate any change in toe-in regardless of the change in load.

It is a known fact that some automobiles vary in camber angle and this device could be used to indicate a camber change due to load changes by a simple modification. The device would be positioned against the wheels while the bifurcated elements were in a vertical relationship instead of horizontally to indicate a toe-in change and the position of the scales and indicators would necessarily be varied so as to make the same readily visible to the operator.

It will be evident that herein is provided a toe-in change indicator for vehicle wheels which will accurately portray any departure from proper and desired toe-in relationship of the front wheels of a vehicle due to changes in load therein. Such a device is not, at the moment, on the market and the fact that toe-in of vehicle wheels does change with varying loads, has apparently never occurred to engineers in the automotive industry or, if it has, has been ignored possibly due to the lack of a suitable device for indicating such variations. As a result, great numbers of automobiles are being operated daily with unnecessary and expensive tire wear which could be avoided by the use of the apparatus of this invention.

In using the apparatus of this invention, the gauges are readily visible to the operator at all times, which is important because unless the mechanic can immediately determine changes in toe-in when the weight on the axle is varied, he will be unable to make the proper adjustment or bending of the steering wheel bars or other wheel supporting or operating elements. Furthermore, the fact that the gauges are always visible insures an immediate determination of the results of such adjustment.

I am aware that many changes may be made and numerous details of construction varied throughout a wide range without departing from the principles of this invention, and I, therefore, do not purpose limiting the patent granted hereon otherwise than as necessitated by the prior art.

I claim as my invention:

A toe-in change indicator for automobiles comprising a pair of associated relatively slidable holding bars adapted to be positioned between the wheels, a spring on the overlapping portions of said bars for forcing the same into wheel contacting position, an L-shaped bracket on the end of each bar and extending rearwardly therefrom when the indicator is in use, a bifurcated element pivotally mounted on the end of each L-shaped bracket for actual wheel contact by said bifurcations, an integral extension of said element projecting forwardly and inwardly of same, a vertical gauge plate fixedly mounted on each L-shaped bracket adjacent the point of connection with its supporting bar, a pointer adapted to move over the gauge plate, a shaft for pivotally mounting the pointer in the L-shaped bracket, a pin fixed in said shaft behind the pointer and an adjusting plate mounted on the extension of each bifurcated element, said adjusting plate being also bifurcated and adapted to receive the upper end of the pin between said bifurcations.

DAVID J. TYERMAN.

References Cited in the file of this patent

UNITED STATES PATENTS

| Number | Name | Date |
|---|---|---|
| 1,777,686 | Bagge | Oct. 7, 1930 |
| 1,785,923 | Wade | Dec. 23, 1930 |
| 1,934,395 | Allan | Nov. 7, 1933 |
| 2,208,063 | Wochner | July 16, 1940 |
| 2,522,916 | Zeigler | Sept. 19, 1950 |
| 2,532,749 | Aurand et al. | Dec. 5, 1950 |

FOREIGN PATENTS

| Number | Country | Date |
|---|---|---|
| 242,331 | Great Britain | Oct. 30, 1925 |